United States Patent
Liu et al.

(10) Patent No.: US 11,750,372 B2
(45) Date of Patent: Sep. 5, 2023

(54) BIOS/OS KEY PROVISIONING SYSTEM

(71) Applicant: Dell Products L.P., Round Rock, TX (US)

(72) Inventors: Wei Liu, Austin, TX (US); Murali Manohar Shanmugam, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 473 days.

(21) Appl. No.: 17/143,374

(22) Filed: Jan. 7, 2021

(65) Prior Publication Data

US 2022/0216984 A1    Jul. 7, 2022

(51) Int. Cl.
*G06F 15/177*    (2006.01)
*G06F 9/00*    (2006.01)
*G06F 9/24*    (2006.01)
*H04L 9/08*    (2006.01)
*G06F 21/60*    (2013.01)
*G06F 9/4401*    (2018.01)

(52) U.S. Cl.
CPC .......... *H04L 9/0819* (2013.01); *G06F 21/606* (2013.01); *H04L 9/0891* (2013.01); *H04L 9/0894* (2013.01); *G06F 9/4401* (2013.01)

(58) Field of Classification Search
CPC ... H04L 9/0819; H04L 9/0891; H04L 9/0894; G06F 21/606; G06F 9/4401; G06F 21/575
See application file for complete search history.

(56) References Cited

U.S. PATENT DOCUMENTS

| | | | |
|---|---|---|---|
| 11,256,589 B2* | 2/2022 | Jeansonne | G06F 21/572 |
| 2011/0093689 A1* | 4/2011 | Pant | G06F 21/606 |
| | | | 713/189 |
| 2017/0140153 A1* | 5/2017 | Zimmer | H04L 9/302 |
| 2020/0241747 A1* | 7/2020 | Gupta | G06F 21/62 |
| 2020/0250293 A1* | 8/2020 | Paulraj | G06F 9/441 |
| 2020/0310826 A1* | 10/2020 | Liu | G06F 21/572 |

FOREIGN PATENT DOCUMENTS

WO    WO-2022025901 A1 *  2/2022

* cited by examiner

*Primary Examiner* — Xuxing Chen
(74) *Attorney, Agent, or Firm* — Joseph Mencher

(57) ABSTRACT

A BIOS/OS key provisioning system includes an NVMe storage device coupled to a server device via a network. The server device includes an operating system engine and a BIOS engine. Subsequent to a current initialization of the server device and prior to an immediately subsequent initialization of the server device, the BIOS engine retrieves a key from a key storage subsystem and stores the key in a BIOS memory subsystem. When the BIOS engine receives a current key request that identifies the key from the operating system engine and determines that the key stored in the BIOS memory system has not previously been accessed subsequent to the current initialization and prior to the subsequent initialization, it provides the key from the BIOS memory subsystem to the operating system, and prevents the key from being provided from the BIOS memory subsystem in response to any subsequent key request.

20 Claims, 9 Drawing Sheets

US 11,750,372 B2

BIOS/OS KEY PROVISIONING SYSTEM

BACKGROUND

The present disclosure relates generally to information handling systems, and more particularly to providing keys between a Basic Input/Output System (BIOS) and an Operating System (OS) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometime connect to network connected storage devices that provide a storage fabric. For example, server devices may be connected to NVMe storage devices via a network and may operate according to the NVMe-oF protocol in order to allow those server devices to store and retrieve data. In many situations, it is desirable to provide secure communication sessions between any server device and the NVMe storage device with which it stores and retrieves data, and those secure communication sessions are typically configured during NVMe-oF boot operations that are performed by the server device and via the Transport Control Protocol (TCP). However, the establishment of such secure communication sessions raises some issues.

One challenge associated with the establishment of such secure communication sessions is the lack of standard interfaces for providing keys and/or other secrets between a BIOS in the server device and an operating system in that server device. For example, NVMe-oF Transport Layer Security Pre-Shared Keys (TLS PSKs) may be utilized to provide a seed for TLS to a target NVMe storage device, and must be provided by a BIOS in the server device to a bootloader included in (or connected to) the operating system in the server device in order to allow for the configuration of a secure NVMe-oF communication session between the server device (an initiator device) and an NVMe storage device (a target device). However, it is desirable for the NVMe-oF TLS PSK to be inaccessible to the operating system user space and secured from any other applications provided by the server device, and thus the storage of the NVMe-Of TLS PSK as a conventional Unified Extensible Firmware Interface (UEFI) variable is not an option because UEFI variables are read-accessible via the operating system in both a kernel mode and a user mode. As such, the secure storage of NVMe-oF TLS PSKs requires non-standard interfaces/hardware on a server device such as Trusted Platform Module (TPM) hardware or a Baseboard Management Controller (BMC) hardware such as the integrated DELL® Remote Access Controller (iDRAC) available in server devices provided by DELL® Inc. of Round Rock, Tex., United States, both of which add cost to server devices and prevent secure NVMe-oF TLS PSK provisioning in standard server devices without such additional hardware.

Accordingly, it would be desirable to provide a BIOS/OS key communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured, subsequent to a current initialization and prior to an immediately subsequent initialization, to: retrieve a key from a key storage subsystem; store the key in a BIOS memory subsystem; receive, from an operating system engine, a current key request that identifies the key; determine, in response to receiving the current key request, that the key stored in the BIOS memory system has not previously be accessed subsequent to the current initialization and prior to the subsequent initialization; provide, in response to determining that the key stored in the BIOS memory system has not previously been accessed subsequent to the current initialization and prior to the subsequent initialization, the key from the BIOS memory subsystem to the operating system; and prevent the key from being provided from the BIOS memory subsystem in response to any subsequent key request.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
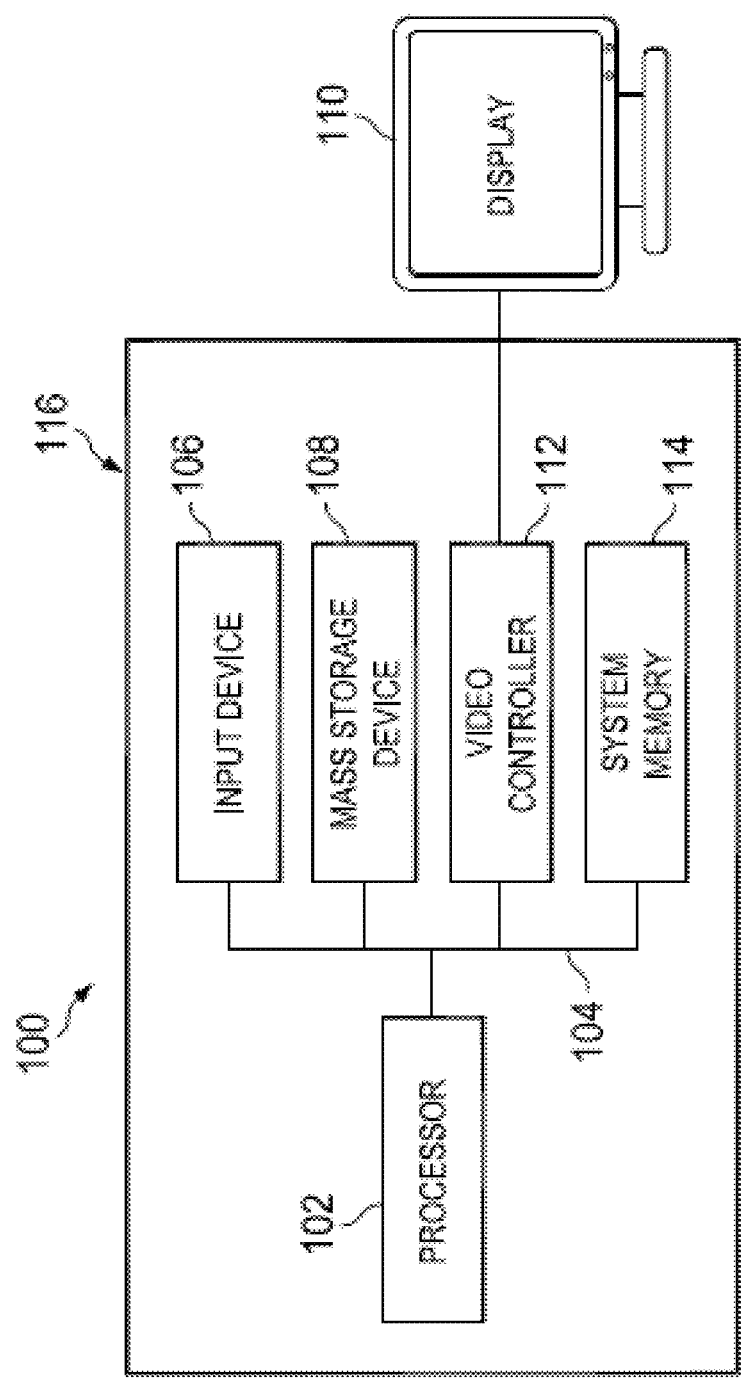
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
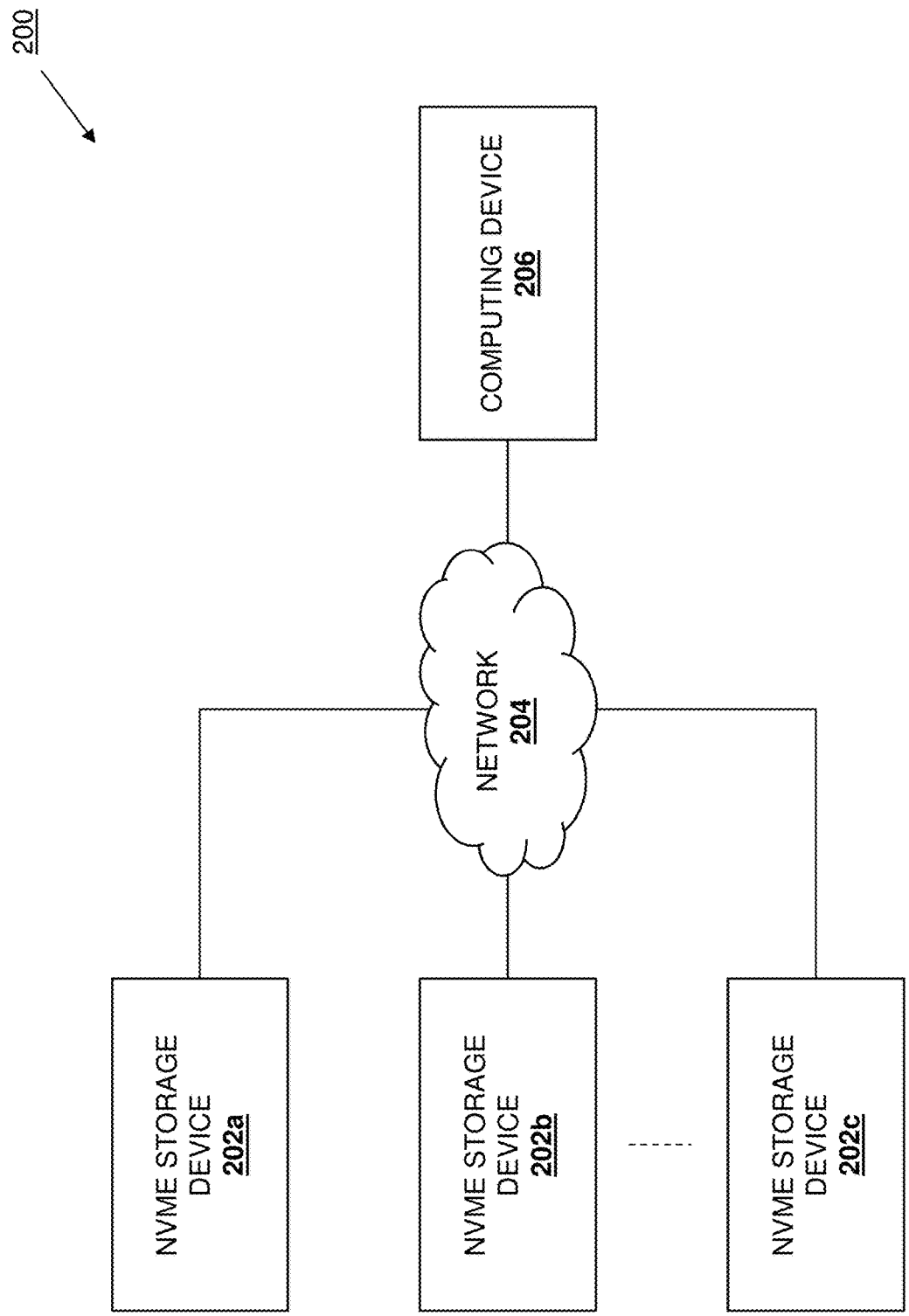
FIG. 2 is a schematic view illustrating an embodiment of a networked system.

Referring now to FIG. 2, an embodiment of a networked system 200 is illustrated. In the illustrated embodiment, the networked system 200 includes a plurality of target devices that are illustrated and discussed below as Non-Volatile Memory Express (NVMe) storage devices 202*a*, 202*b*, and up to 202*c*. In an embodiment, the NVMe storage devices 202*a*-202*c* may be provided by the IHS 100 discussed above with reference to FIG. 1, and/or may include some or all of the components of the IHS 100, and in the specific examples below are described as being configured according to the NVMe over Fabrics (NVMe-oF) protocol. However, while illustrated and discussed as NVMe storage devices configured according to the NVMe-oF protocol, one of skill in the art in possession of the present disclosure will recognize that target devices provided in the networked system 200 may include any devices that may be configured to operate similarly as the NVMe storage devices 202*a*-202*c* discussed below.

In the illustrated embodiment, the NVMe storage devices 202*a*-202*c* are coupled to a network 204 that may be provided by a Local Area Network (LAN), the Internet, combinations thereof, and/or other networks that would be apparent to one of skill in the art in possession of the present disclosure. Furthermore, a computing device 206 is coupled to the NVMe storage devices 202*a*-202*c* via the network 204. In an embodiment, the computing device 206 may be provided by the IHS 100 discussed above with reference to FIG. 1, and/or may include some or all of the components of the IHS 100, and in the specific examples below is described as being provided by a server device. However, while illustrated and discussed as being provided by a server device, one of skill in the art in possession of the present disclosure will recognize that computing devices provided in the networked system 200 may include any devices that may be configured to operate similarly as the computing device discussed below. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
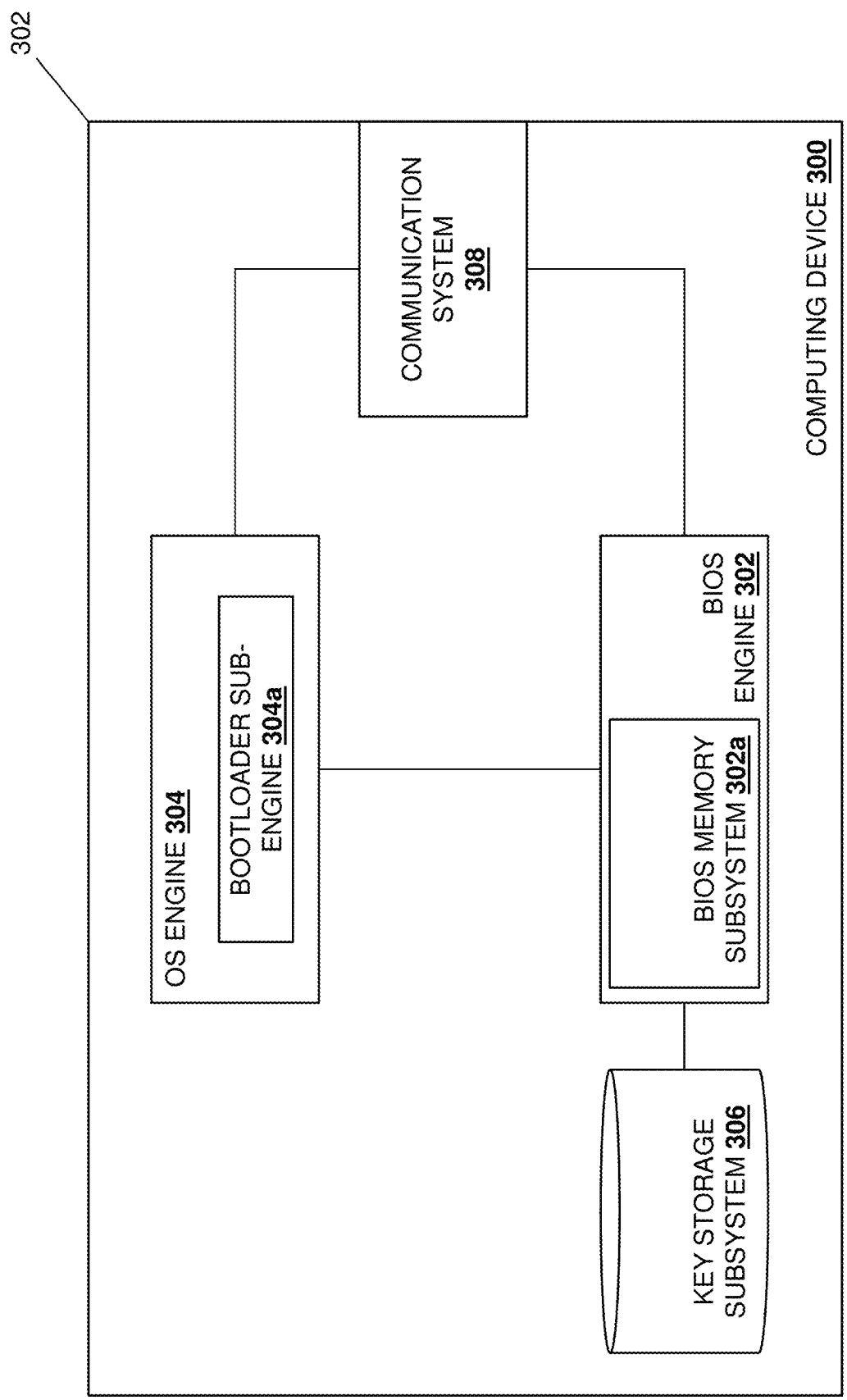
FIG. 3 is a schematic view illustrating an embodiment of a computing device that may be provided in the networked system of FIG. 2 and that may utilize the BIOS/OS key provisioning system of the present disclosure.

Referring now to FIG. 3, an embodiment of a computing device 300 is illustrated that may provide the computing device 206 discussed above with reference to FIG. 2. As such, the computing device 300 may be provided by the IHS 100 discussed above with reference to FIG. 1 and/or may include some or all of the components of the IHS 100, and in specific examples discussed below is described as being provided by a server device. However, while illustrated and discussed as being provided by a server device, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to perform the functionality of the engines and/or computing devices discussed below.

In the specific examples illustrated and described below, the chassis 302 may house a BIOS processing system and a BIOS memory system that is coupled to the BIOS processing system and that includes instructions that, when executed by the BIOS processing system, cause the BIOS processing system to provide a BIOS engine 302 that is configured to perform the functionality of the BIOS engines and/or computing devices discussed below. As will be appreciated by one of skill in the art in possession of the present disclosure, the BIOS engine 304 may be provided by BIOS firmware that is configured to perform hardware initialization for the computing device 300 during booting/initialization operations (e.g., a Power-On Startup (POST) operation), as well as provide runtime services for operating systems and/or applications provided on the computing device 300. Furthermore, while illustrated and described as a BIOS, one of skill in the art in possession of the present disclosure will appreciate that BIOS engine 302 may be provided according to the Unified Extensible Firmware Interface (UEFI) specification that defines a software interface between an operating system in the computing device 300 and platform firmware in the computing device 300, and that was provided to replace the legacy BIOS firmware interface. As illustrated, the BIOS engine 302 may include a BIOS memory subsystem 302a that, in the specific examples discussed below, is provided by a System Management Random Access Memory (SMRAM) that is only accessible in a System Management Mode (SMM), which one of skill in the art in possession of the present disclosure will recognize prevents malicious decoding of information in that BIOS memory subsystem 302a. However, one of skill in the art in possession of the present disclosure will appreciate that the BIOS memory subsystem 302a discussed below may be provided in other manners that will fall within the scope of the present disclosure as well.

In the specific examples illustrated and described below, the chassis 302 may also house an Operating System (OS) processing system and an OS memory system that is coupled to the OS processing system and that includes instructions that, when executed by the OS processing system, cause the OS processing system to provide an OS engine 304 that is configured to perform the functionality of the OS engines and/or computing devices discussed below. As will be appreciated by one of skill in the art in possession of the present disclosure, the OS engine may be configured to perform runtime operations following initialization operations performed by the BIOS engine 302, as well as perform other operating system functionality known in the art. Furthermore, the OS engine 302 may include a bootloader sub-engine 304a that, in the specific examples discussed below, may be integrated as part of the OS engine 304. However, one of skill in the art in possession of the present disclosure will appreciate that the bootloader sub-engine 304a discussed below may be provided by a device or subsystem that may be considered separate from the OS engine 304, as well as in other manners that will fall within the scope of the present disclosure as well.

The chassis 302 may also house a storage system (not illustrated, but which may include the storage 108 discussed above with reference to FIG. 1) that is coupled to the BIOS engine 302 (e.g., via a coupling between the storage system and the BIOS processing system) and that includes a key storage subsystem 306 that is configured to store the keys (e.g., the NVMe-oF TLS PSK keys discussed above) and/or any other shared secret information utilized by the BIOS engine 302 as discussed below. In a specific example, the key storage subsystem 306 may be provided by a Serial Peripheral Interface (SPI) flash memory device that is accessible by the BIOS engine 302, although other key storage subsystems will fall within the scope of the present disclosure as well. The chassis 302 may also house a communication system 308 that is coupled to the BIOS engine 302 and the OS engine 304 (e.g., via a coupling between the communication system 308 and each of the BIOS processing system and OS processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
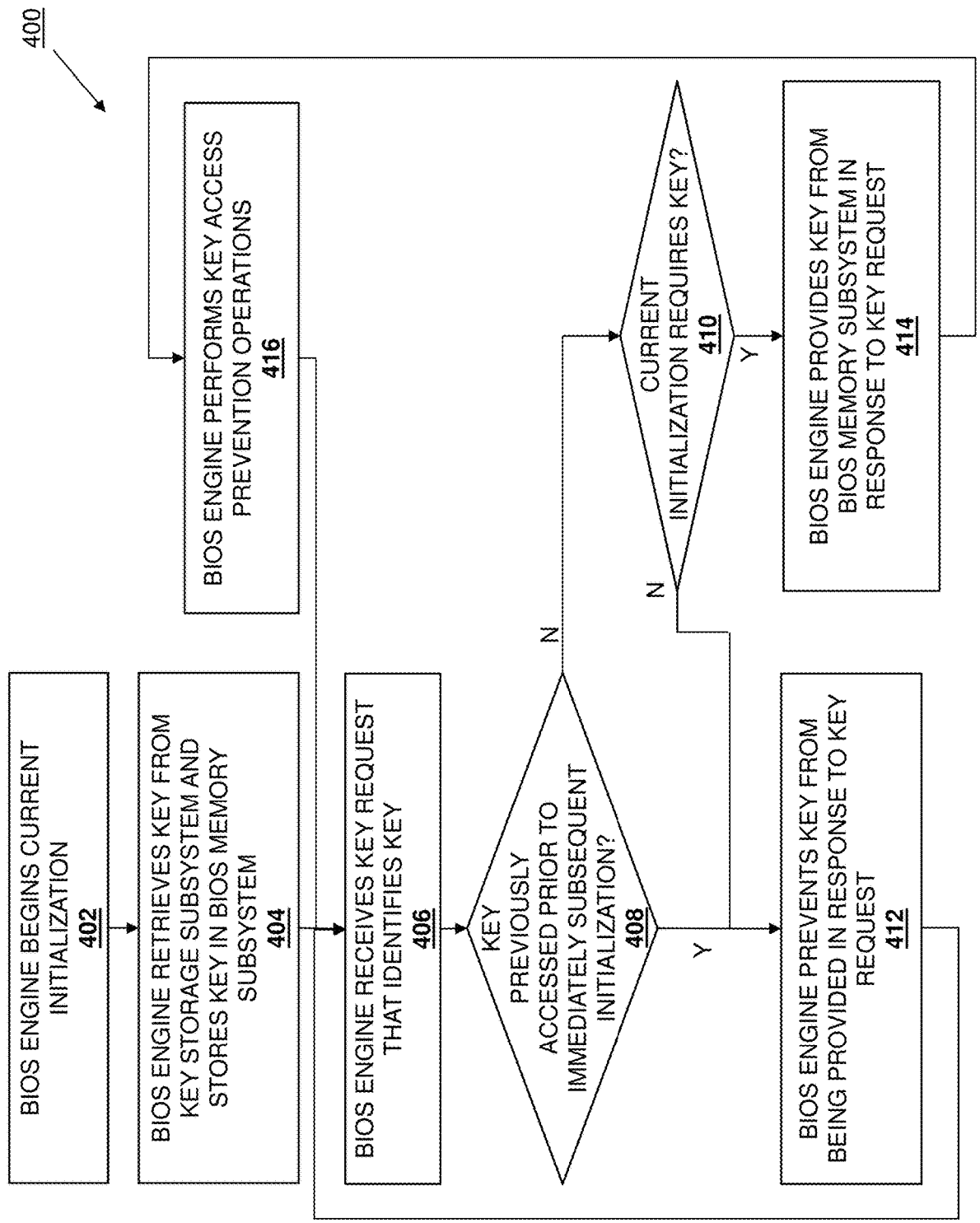
FIG. 4 is a flow chart illustrating an embodiment of a method for providing keys between a BIOS and an OS.

Referring now to FIG. 4, an embodiment of a method 400 for providing keys between a BIOS and an OS is illustrated. As discussed below, the systems and methods of the present disclosure may provide for the secure provisioning of an NVMe-oF communication session key between a BIOS and an operating system in a server device. For example, the BIOS/OS key provisioning system of the present disclosure may include an NVMe storage device coupled to a server device via a network. The server device includes an operating system engine and a BIOS engine. Subsequent to a current initialization of the server device and prior to an immediately subsequent initialization of the server device, the BIOS engine retrieves a key from a key storage subsystem and stores the key in a BIOS memory subsystem. When the BIOS engine receives a current key request that identifies the key from the operating system engine and determines that the key stored in the BIOS memory system has not previously been accessed subsequent to the current initialization and prior to the subsequent initialization, it provides the key from the BIOS memory subsystem to the operating system, and prevents the key from being provided from the BIOS memory subsystem in response to any subsequent key request. As such, the secure storage of NVMe-oF communication session keys is enabled without the need for non-standard interfaces/hardware on a server device.

Figure 5A:
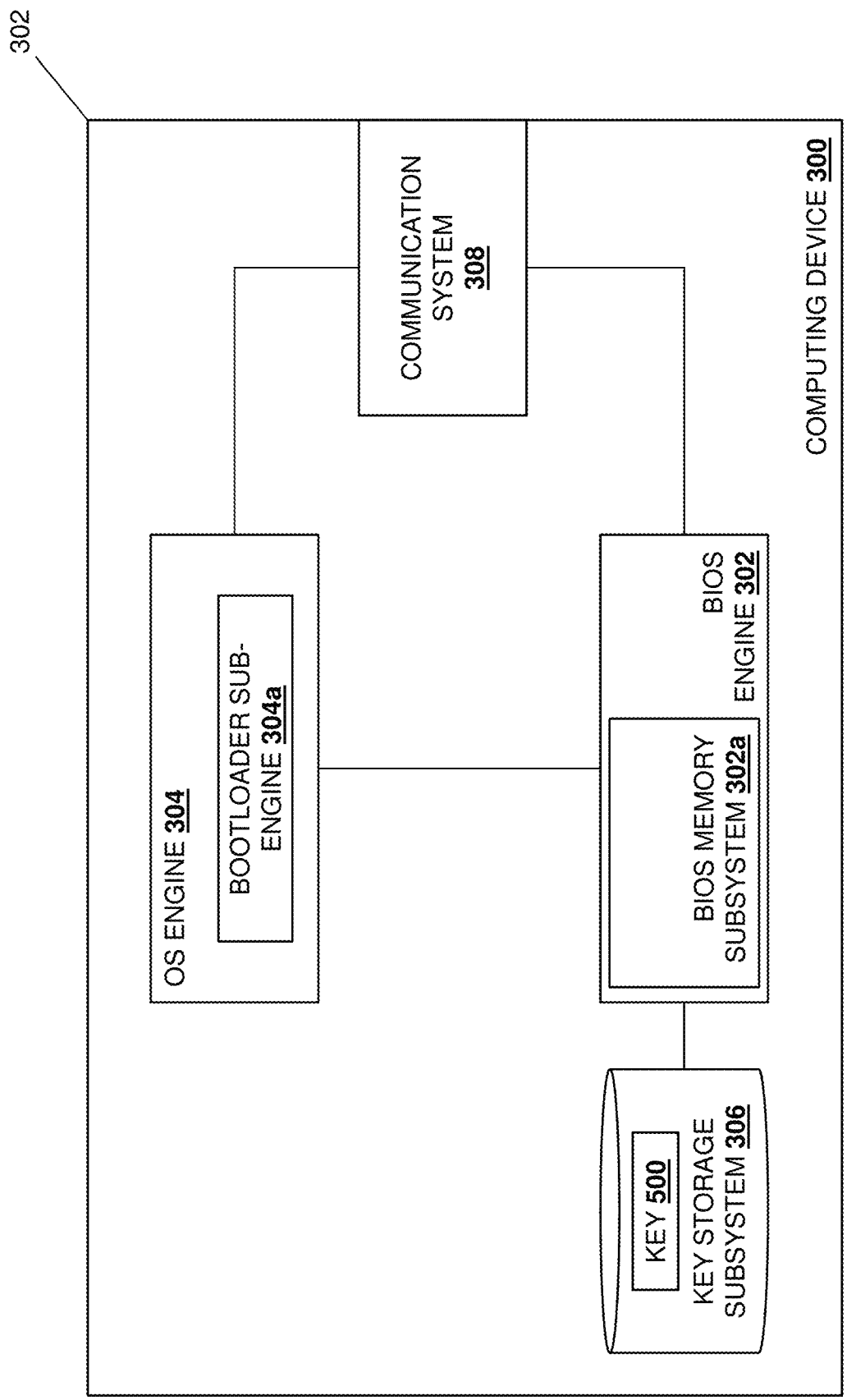
FIG. 5A is a schematic view illustrating an embodiment of the computing device of FIG. 3 operating during the method of FIG. 4.

The method 400 begins at block 402 where a BIOS engine begins a current initialization. With reference to FIG. 5A, during or prior to the method 400, some embodiments may include a network administrator or other user providing a key 500 in the key storage subsystem 500. For example, the key 500 may be provided by a NVMe-oF Transport Layer Security Pre-Shared Key (TLS PSK), and one of skill in the art in possession of the present disclosure in the art will recognize how such a key may be shared with both the computing device 300 (e.g., by providing it in a SPI flash memory device that provides the key storage subsystem 306) and an NVMe storage device with which the network administrator or other user would like the computing device 206/300 to establish a secure NVMe-oF communication session. Thus, while the key 500 is discussed below as being provided to allow the computing device 206/300 to establish a secure NVMe-oF communication session with the NVMe storage device 202a, one of skill in the art in possession of the present disclosure will appreciate that a similar respective key may be provided in the key storage subsystem 306 and shared with any NVMe storage device 202b and up to 202c in order to allow the computing device 206/300 to establish a secure NVMe-oF communication session with that NVMe storage device as well.

In an embodiment, at block 402, the computing device 300 may be powered on, reset, restarted, and/or otherwise initialized, which one of skill in the art in possession of the present disclosure will appreciate will operate to cause the BIOS engine 302 to begin a "current initialization". For example, one of skill in the art in possession of the present disclosure will recognize that the BIOS engine 302 may be the first software in the computing device 300 that runs following the initialization of the computing device 300, and the "current initialization" of that BIOS engine 302 is used herein to distinguish any particular initialization operations performed by the BIOS engine 302 that are immediately followed by runtime operations performed by the OS engine 304, which may then be followed by subsequent initialization operations performed by that BIOS engine 302 (e.g., in response to the powering off/powering on of the server device 300, the resetting of the server device 300, the restarting of the server device 300, etc.) As discussed in further detail below, the BIOS engine 302 operates to make the key 500 available to the OS engine 304 only once following a current initialization and prior to an immediately subsequent initialization, and thus any current initialization will begin the operations discussed below where the key 500 is made available to the OS engine 304 once, after which that key 500 will not be available to the OS engine 304 until the server device 300 is once again initialized.

Figure 5B:
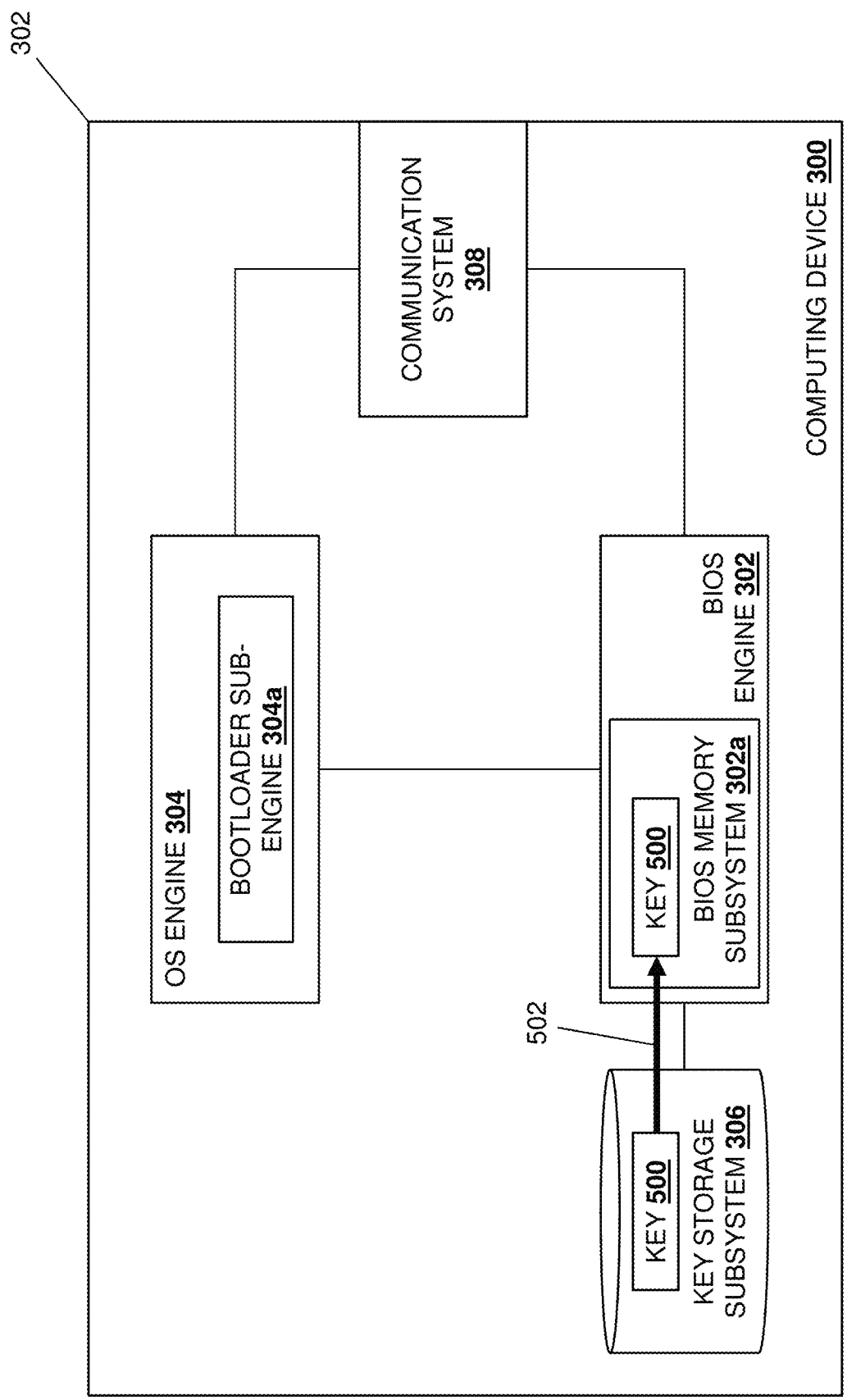
FIG. 5B is a schematic view illustrating an embodiment of the computing device of FIG. 3 operating during the method of FIG. 4.

The method 400 then proceeds to block 404 where the BIOS engine retrieves a key from a key storage subsystem and stores the key in a BIOS memory subsystem. In an embodiment, at block 404 and in response to beginning the current initialization at block 402, the BIOS engine 302 may perform BIOS Power-On Self-Test (POST) operations, and may establish key connectivity (e.g., NVMe-oF TLS PSK connectivity) with the NVMe storage device 202a (which in this example shares the key 500 that was provided in the key storage subsystem 306) in manner that will allow for NVMe-oF Transport Control Protocol (TCP) boot operations. As illustrated in FIG. 5B, at block 404 the BIOS engine 302 may then perform key retrieval and storage operations 502 that include retrieving the key 500 from the key storage subsystem 306 (e.g., an SPI flash memory device that is accessible to the BIOS engine 302), and storing that key 500 in the BIOS memory subsystem 302a (e.g., an SM-RAM that is accessible to the BIOS engine 302).

In some embodiments, the storage of the key 500 in the BIOS memory subsystem 302a may include the BIOS engine 302 storing that key as a "read-once" Unified Firmware Interface (UEFI) variable provided according to the teachings of the present disclosure. For example, at block 404, the BIOS engine 302 may set up constructs for the key 500 that are similar to conventional UEFI variables, but that allow the BIOS engine 302 to note that the key 500 stored in the BIOS memory subsystem 302a is a "read-once" UEFI variable that may only be provided once to the OS engine 304 (e.g., in response to a key read request) following a current initialization and prior to a subsequent initialization. In a specific example, the constructs set up for the key 500 as discussed above may be any portions of BIOS code that indicate that the key 500 in the BIOS memory subsystem 302a is a "read-once" UEFI variable, and that provide for any of the "read-once" functionality described herein. However, while specific examples have been provided, one of skill in the art in possession of the present disclosure will appreciate that the functionality described below with regard to the "read-once" key 500 may be provided in a variety of manners that will fall within the scope of the present disclosure as well.

In some embodiments, at block 404, the BIOS engine 302 may also operate to build an NVMe-OF Boot Firmware Table (nBFT), which one of skill in the art in possession of the present disclosure will recognize is an Advanced Configuration and Power Interface (ACPI) structure that the BIOS engine 302 may build in an ACPI memory subsystem (not illustrated), and which may be configured by the BIOS engine 302 to specify the local and remote aspects of a fabric-attached boot configuration. Furthermore, at block 404, the BIOS engine 302 may then perform NVMe-oF TCP boot operations with the NVMe storage device 202a (e.g., an NVMe target), which may include downloading or otherwise retrieving code for the bootloader sub-engine 304a, and executing that code such that the bootloader sub-engine 304a begins operations. As will be appreciated by one of skill in the art in possession of the present disclosure, the bootloader sub-engine 304a (or an operating system kernel) may be the first software that is included in (or associated with) the operating system engine 302 to execute after the BIOS engine 302, and may take control of the computing device 300 prior to any other software included on the computing device 300. As such, the "read-once" nature of the key 500 described below ensures that only the bootloader sub-engine 304a/operating system engine 304 in the immediate "chain-of-trust" in the computing device 300 will have access to the key 500.

Figure 5C:
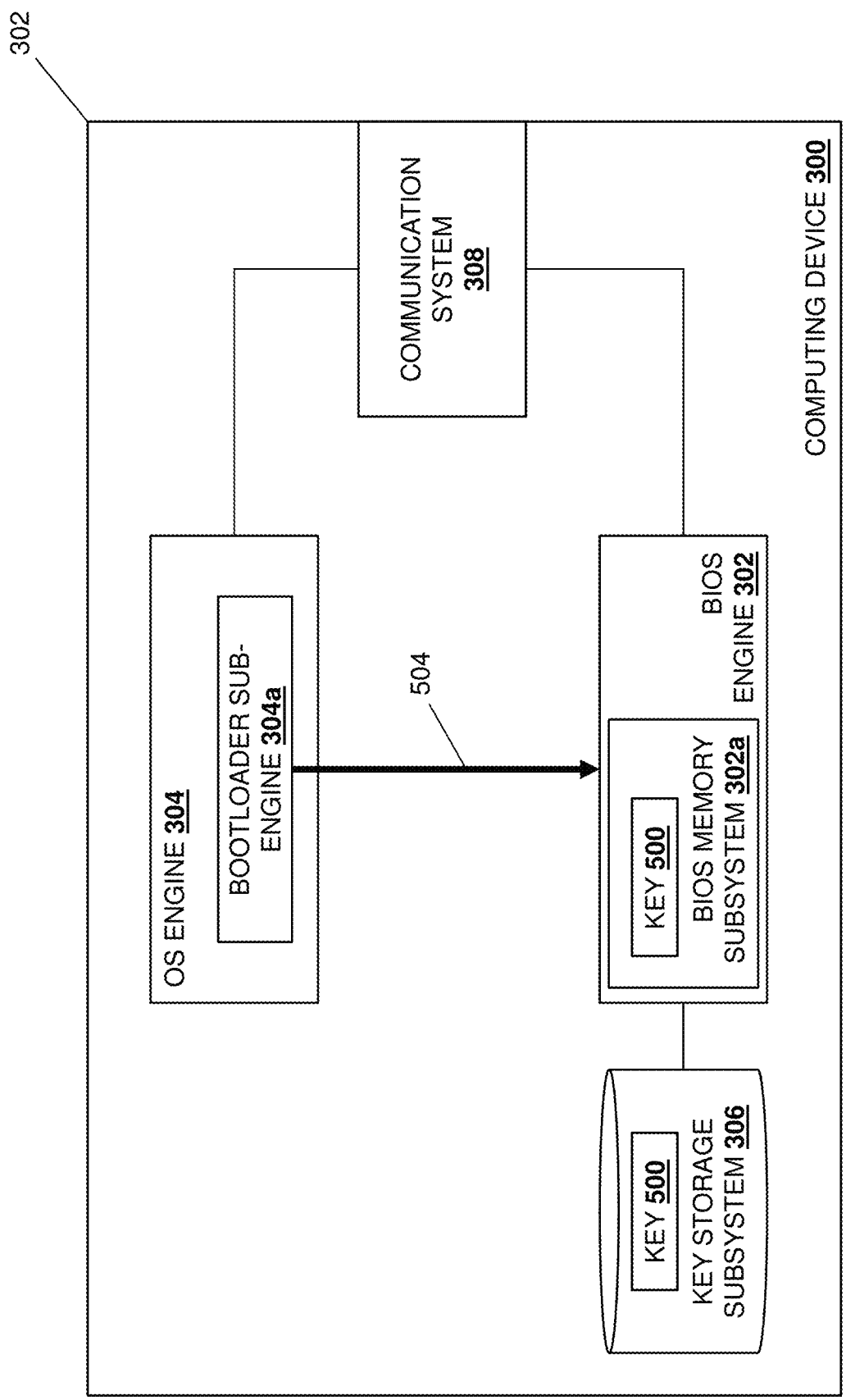
FIG. 5C is a schematic view illustrating an embodiment of the computing device of FIG. 3 operating during the method of FIG. 4.

The method 400 then proceeds to block 406 where the BIOS engine receives a key request that identifies the key. In an embodiment, at block 406, the bootloader sub-engine 304a may operate to determine whether the key 500 is required for use in the initialization operations in order to establish a secure NVMe-oF communication session with the NVMe storage device 202a. For example, at block 406 the bootloader sub-engine 304a may parse the nBFT discussed above in order to, for example, determine whether an authentication and secure channel bit is set, and one of skill in the art in possession of the present disclosure will appreciate that the setting of the authentication and secure channel bit in the nBFT may indicate that the key 500 must be provided by the BIOS engine 302 to the OS engine 304. However, while a specific example of determining whether the key 500 is required for use in the initialization operations has been provided, one of skill in the art in possession of the present disclosure will recognize that the determination of whether to retrieve the key 500 from the BIOS engine 302 may be made in a variety of manners that will fall within the scope of the present disclosure as well. With reference to FIG. 5C, in response to determining that the key 500 should be retrieved from the BIOS engine 302 in order to establish a secure NVMe-oF communication session with the NVMe storage device 202a, the bootloader sub-engine 304a may perform key retrieval request operations 504 that may include generating a System Management Interrupt (SMI) with the BIOS engine 302, and transmitting a key request that identifies the key 500. As such, at block 406, the BIOS engine 302 receives the key request from the bootloader sub-engine 304a. As will be appreciated by one of skill in the art in possession of the present disclosure, the BIOS engine 302 and the OS engine 304 may communicate directly via UEFI variable services, and/or using other techniques that would be apparent to one of skill in the art in possession of the present disclosure.

The method 400 then proceeds to decision block 408 where it is determined whether the key was previously accessed prior to an immediately subsequent initialization. In an embodiment, at decision block 408 and in response to receiving the key request from the bootloader sub-engine 304a, the BIOS engine 302 may operate to determine whether the key 500 in the BIOS memory subsystem 302a was previously accessed during the current initialization and prior to an immediately subsequent initialization. As discussed below, following the first access of a key that is designated as a "read-once" UEFI variable and stored in the BIOS memory subsystem 302a, the BIOS engine 302 may increment a counter to indicate that key has been access subsequent to the current initialization, and/or may erase that key from the BIOS memory subsystem 302a. As such, in some embodiments, the BIOS engine 302 may operate to determine whether the key 500 in the BIOS memory subsystem 302a was previously accessed during the current initialization and prior to an immediately subsequent initialization by determining whether the counter has been incremented and/or whether the key 500 is stored in the BIOS memory subsystem 302a.

If, at decision block 408, it is determined that the key in the BIOS memory subsystem was not previously accessed prior to an immediately subsequent initialization, the method 400 proceeds to block decision block 410 where it is determined whether the current initialization requires the key. In an embodiment, at decision block 410 and in response to determining that the counter has not been incremented and/or the key 500 is stored in the BIOS memory subsystem 302a, the BIOS engine 302 may determine whether the current initialization requires the key 500. As discussed below, some embodiments of the present disclosure may include the BIOS engine 302 performing additional security checks (i.e., in addition to determining whether the key 500 was previously accessed during the current initialization and prior to an immediately subsequent initialization). Continuing with the specific example in which the key 500 being requested is an NVMe-oF TLS PSK, such additional security checks may include the BIOS engine 302 determining whether NVMe-oF TCP boot operations that require the NVMe-oF TLS PSK are being performed. However, while one specific additional security check is described, one of skill in the art in possession of the present disclosure will recognize that other additional security checks may be performed while remaining within the scope of the present disclosure as well. Furthermore, in some embodiments, the security check at decision block 406 to determine whether the key 500 was previously accessed during the current initialization and prior to an immediately subsequent initialization may be the only security check performed during the method 400, and decision block 408 may be omitted.

If, at decision block 410, it is determined that the current initialization does not require the key, the method 400 proceeds to block 412 where the BIOS engine prevents the key from being provided in response to the key request. In an embodiment, at block 412 and in response to determining that the current initialization (e.g., which includes NVMe-oF TCP boot operations) that require the key 500 (e.g., an NVMe-oF TLS PSK) are not being performed, the BIOS engine 302 may return an error in response to the key request received at block 406. As such, even in the event that the key 500 has not been previously accessed during the current initialization and prior to an immediately subsequent initialization, the BIOS engine 302 may still prevent that key 500 from being provided in response to a key request if the current initialization does not require that key 500, or if other additional security requirements are not satisfied.

Figure 5D:
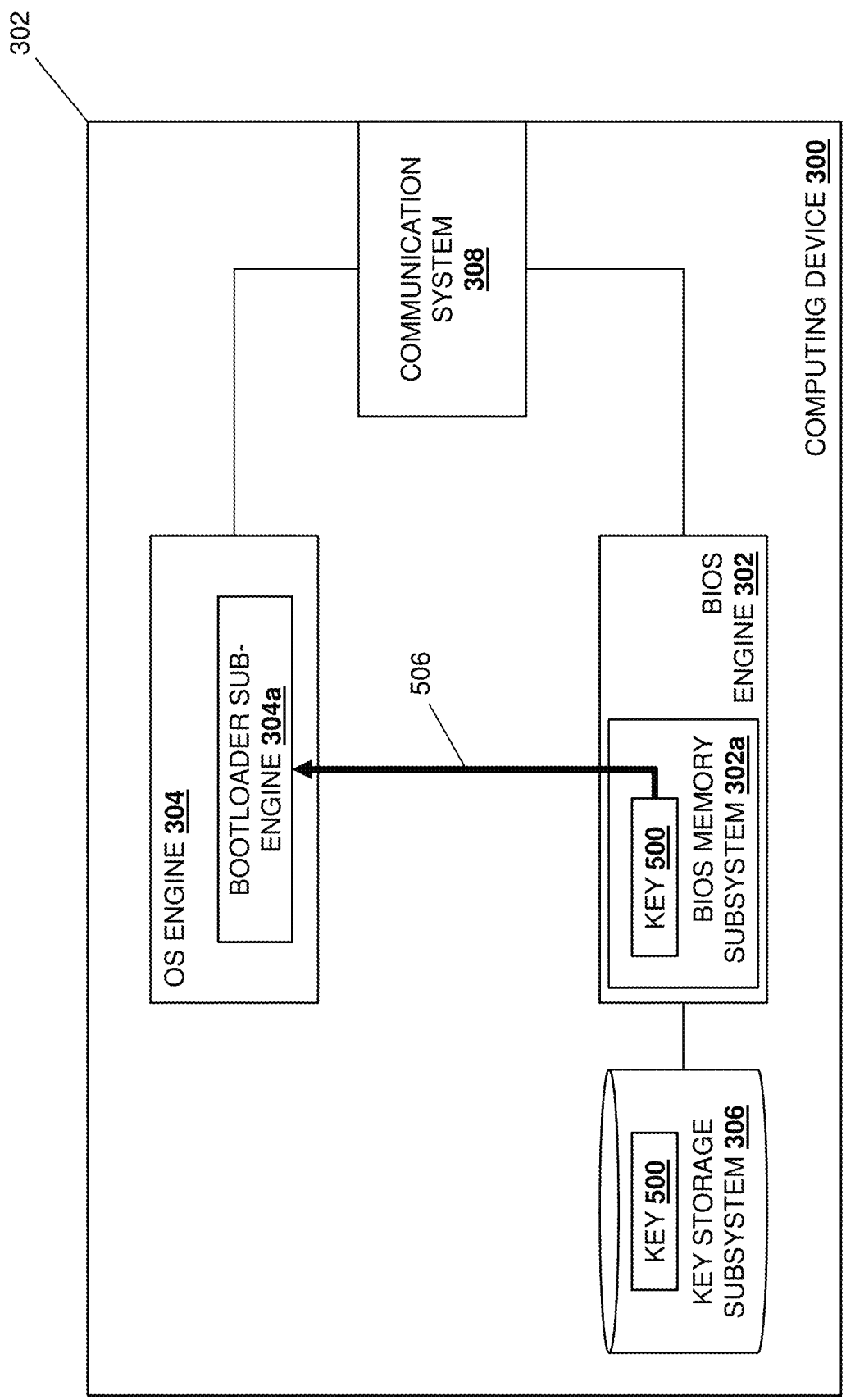
FIG. 5D is a schematic view illustrating an embodiment of the computing device of FIG. 3 operating during the method of FIG. 4.

If, at decision block 410, it is determined that the current initialization requires the key, the method 400 proceeds to block 414 where the BIOS engine provides the key from the BIOS memory subsystem in response to the key request. With reference to FIG. 5D, in an embodiment of block 414 and in response to determining that the key 500 was not previously accessed during the current initialization and prior to an immediately subsequent initialization (and in some embodiments in response to also determining that the key is required for the current initialization), the BIOS engine 302 may perform key provisioning operations 506 that include retrieving the key 500 from the BIOS memory subsystem 302a and transmitting that key 500 to the bootloader sub-engine 304a. As will be appreciated by one of skill in the art in possession of the present disclosure, the bootloader sub-engine 304a may then utilize the key 500 (e.g., an NVMe-oF TLS PSK that is shared with the NVMe storage device 202a) to create an ephemeral, secure NVMe-oF connection (from the bootloader sub-engine 304a to the NVMe storage device 202a) and establish an secure NVMe-oF communication session with the NVMe storage device 202a, as described in the NVMe-oF protocol specification and/or using a variety of secure NVMe-oF communication session establishment techniques known in the art. Following the establishment of the secure NVMe-oF communication session with the NVMe storage device 202a, the BIOS engine 302 and/or the OS engine 304 may operate to complete any further initialization operations and enter a runtime state.

Figure 5E:
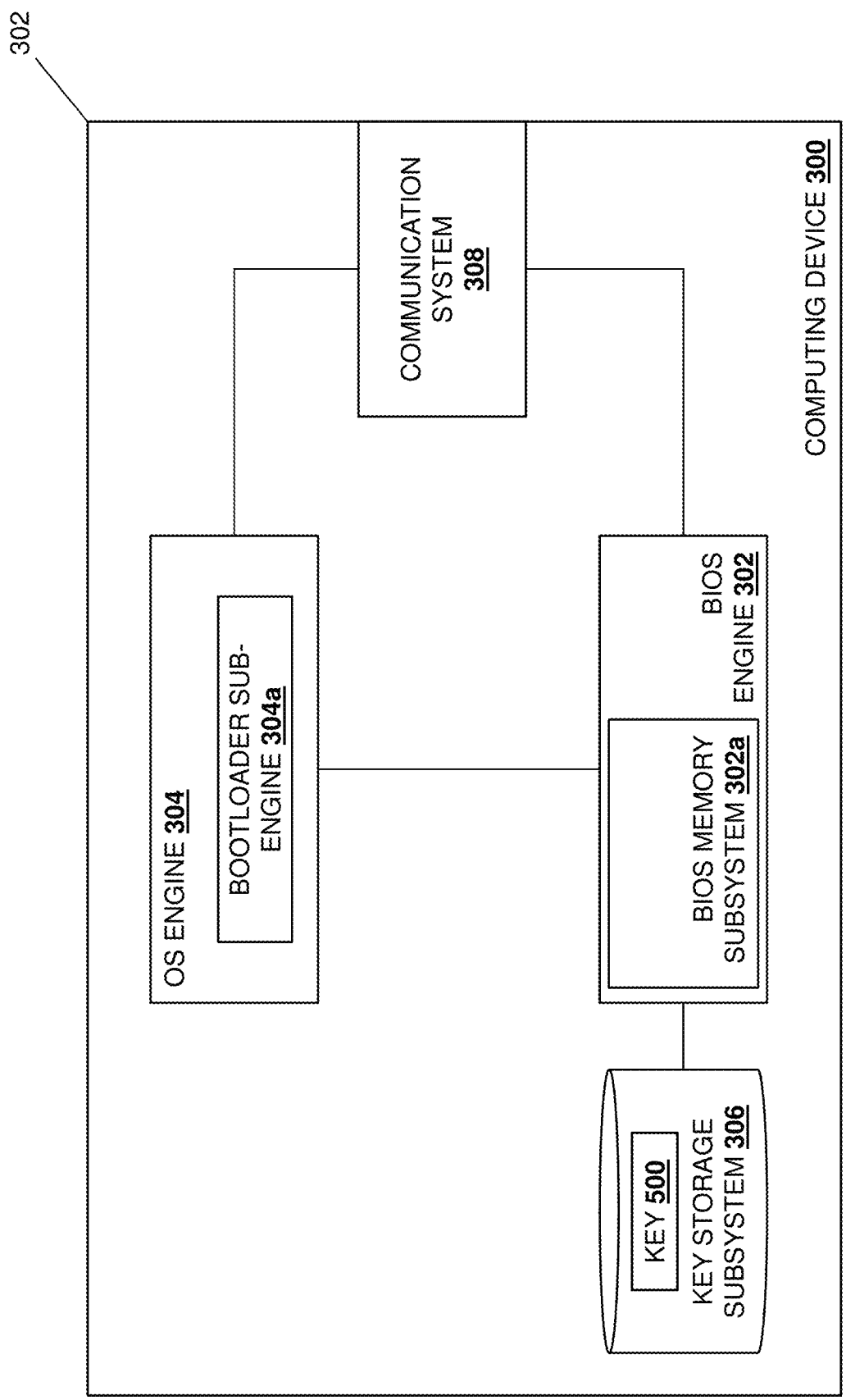
FIG. 5E is a schematic view illustrating an embodiment of the computing device of FIG. 3 operating during the method of FIG. 4.

The method 400 then proceeds to block 416 where the BIOS engine performs key access prevention operations. In an embodiment, at block 416 and subsequent to transmitting the key 500 to the bootloader sub-engine 304a, the BIOS engine 302 may perform key access prevention operations that, as discussed above, may include incrementing a counter to indicate that first access of the key 500, erasing that key from the BIOS memory subsystem 302a (as illustrated in FIG. 5E), and/or performing a variety of other key access prevention operations that one of skill in the art in possession of the present disclosure will appreciate will prevent subsequent access to the key 500 during the current initialization and prior to an immediately subsequent initialization. As such, in one specific example of block 416, the BIOS engine 302 may only increment the counter to indicate that the key 500 has been accessed during the current initialization and prior to an immediately subsequent initialization, while leaving that key 500 stored in the BIOS memory subsystem 302a. However, in another specific example of block 416, the BIOS engine 302 may simply erase the key 500 from the BIOS memory subsystem 302a (e.g., without incrementing any counter). Furthermore, in yet another specific example, the BIOS engine 302 may both increment the counter to indicate that the key 500 has been accessed during the current initialization and prior to an immediately subsequent initialization, while also erasing the key 500 from the BIOS memory subsystem 302a. As will be appreciated by one of skill in the art in possession of the present disclosure and as discussed in further detail below, any of the operations discussed above may operate to prevent further access to the key 500 prior to an immediately subsequent initialization.

As such, the first iteration of the method 400 described above presents an example of the systems and methods of the present disclosure providing a first access to the key 500 following a current initialization and prior to an immediately subsequent initialization, and following block 416, the method 400 then returns to block 406 to begin a second iteration of the method 400 that is performed prior to the immediately subsequent initialization. As such, during the second iteration of the method 400 at block 406, the BIOS engine 302 may receive another key request that identifies the key 500, and the method 400 may proceed to decision block 408. As will be appreciated by one of skill in the art in possession of the present disclosure, the key request received at block 406 during this second iteration of the method 400 is very likely an illegitimate request from malicious software included in and/or provided by the operating system engine 304 (or as a result of a software issue with the operating system), as normal operation of the BIOS/OS key provisioning system would only expect the key exchange to occur once, and thus access to the key 500 in response to that request will be prevented by the BIOS engine 302.

As such, at decision block 408 and in this second iteration of the method 400, it will be determined that the key 500 in the BIOS memory subsystem was previously accessed prior to an immediately subsequent initialization, and the method 400 will proceed to block 412 where the BIOS engine 302 prevents the key 500 from being provided in response to the key request received at block 406 (i.e., in this second iteration of the method 400). In some embodiments, at block 412, the BIOS engine 302 may return a key retrieval error in response to the key request received at block 406 in this second iteration of the method 400. In one example, the key 500 may be stored in the BIOS memory subsystem 302a, but in response to determining that the counter was incremented at decision block 408 in this second iteration of the method 400, the BIOS engine 302 may return a key retrieval error in response to the key request that was received at block 406 in this second iteration of the method 400. In another example, the key 500 may have been erased from the BIOS memory subsystem 302a, and in response to determining that the key 500 requested via the key request received at block 406 in this second iteration of the method 400 is not stored in the BIOS memory subsystem 302a (at decision block 408 and in this second iteration of the method 400), the BIOS engine 302 may return a key retrieval error in response to the key request received at block 406 in this second iteration of the method 400. In yet another example, the key 500 may have been erased from the BIOS memory subsystem 302a, and in response to determining that the key 500 requested via the key request received at block 406 in this second iteration of the method 400 is not stored in the BIOS memory subsystem 302a (at decision block 408 and in this second iteration of the method 400), the BIOS engine 302 may simply not be able return the key 500 in response to the key request received at block 406 in this second iteration of the method 400.

The method 400 then returns to block 406, and may loop through blocks 406, 408 and 412 to prevent any further access to the key 500 prior to the immediately subsequent initialization. However, one of skill in the art in possession of the present disclosure will appreciate that a subsequent power-off/power-on, reset, restart, or other initialization of the computing device 300 may restart the method 400, which then causes that "subsequent" initialization to become the "current" initialization of block 402, with the BIOS engine 302 retrieving the key 500 from the key storage subsystem 306 and storing it in the BIOS memory subsystem 302a at block 404, and then again operating as discussed above to only provide access to that key 500 once following that current initialization and prior to any further subsequent initialization similarly as discussed above. As such, the key 500 is provided in the computing device 300 as a "read-once" key that can only be accessed by the OS engine 304 once per initialization cycle for the computing device 300, thus ensuring security of that key 500 for the establishment of secure NVMe-oF communication sessions.

Thus, systems and methods have been described that provide for the secure provisioning of a key between a BIOS and an operating system in a server device. For example, the BIOS/OS key provisioning system of the present disclosure may include an NVMe storage device coupled to a server device via a network. The server device includes an operating system engine and a BIOS engine. Subsequent to a current initialization of the server device and prior to an immediately subsequent initialization of the server device, the BIOS engine retrieves a key from a key storage subsystem and stores the key in a BIOS memory subsystem. When the BIOS engine receives a current key request that identifies the key from the operating system engine and determines that the key stored in the BIOS memory system has not previously been accessed subsequent to the current initialization and prior to the subsequent initialization, it provides the key from the BIOS memory subsystem to the operating system, and prevents the key from being provided from the BIOS memory subsystem in response to any subsequent key request. As such, the secure storage of NVMe-oF session keys is enabled without the need for non-standard interfaces/hardware on a server device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS)/Operating System (OS) key provisioning system, comprising:
  a Non-Volatile Memory express (NVMe) storage device that is coupled to a network; and
  a server device that is coupled to the NVMe storage device via the network, wherein the server device includes:
    an operating system engine; and
    a Basic Input/Output System (BIOS) engine that is coupled to the operating system engine and that is configured, subsequent to a current initialization of the server device and prior to an immediately subsequent initialization of the server device, to:
      retrieve a key from a key storage subsystem;
      store the key in a BIOS memory subsystem;
      receive, from the operating system engine, a current key request that identifies the key;
      determine, in response to receiving the current key request, that the key stored in the BIOS memory system has not previously be accessed subsequent to the current initialization and prior to the subsequent initialization;
      provide, in response to determining that the key stored in the BIOS memory system has not previously been accessed subsequent to the current initialization and prior to the subsequent initialization, the key from the BIOS memory subsystem to the operating system; and
      prevent the key from being provided from the BIOS memory subsystem in response to any subsequent key request.

2. The system of claim 1, wherein the preventing the key from being provided from the BIOS memory subsystem in response to any subsequent key request includes:
  incrementing a key request counter in response to providing the key from the BIOS memory subsystem to the operating system;
  receiving a first subsequent key request that identifies the key;
  determine, in response to receiving the first subsequent key request, that the key request counter was incremented; and returning, in response to determining that the key request counter was incremented, a key retrieval error in response to the first subsequent key request.

3. The system of claim 1, wherein the preventing the key from being provided from the BIOS memory subsystem in response to any subsequent key request includes:
erasing the key from the BIOS memory subsystem in response to providing the key from the BIOS memory subsystem to the operating system;
receiving a first subsequent key request that identifies the key; and
determine, in response to receiving the first subsequent key request, that the key is no longer stored in the BIOS memory subsystem.

4. The system of claim 1, wherein the BIOS engine is configured to:
determine, in response to receiving the current key request, that the current initialization of the server device is an NVMe-over Fabrics (NVMe-oF) initialization;
provide, in response to determining that the current initialization of the server device is an NVMe-oF initialization and that the key stored in the BIOS memory system has not previously be accessed subsequent to the current initialization and prior to the immediately subsequent initialization, the key from the BIOS memory subsystem to the operating system.

5. The system of claim 1, wherein the BIOS memory subsystem includes a System Management Random Access Memory (SMRAM) that is only accessible in a System Management Mode (SMM).

6. The system of claim 1, wherein the operating system engine includes a bootloader sub-engine that is configured to generate and transmit the current key request.

7. The system of claim 1, wherein the operating system engine is configured to establish an NVMe over Fabrics (NVMe-oF) secure communication session with the NVMe storage device using the key.

8. An Information Handling System (IHS), comprising:
a processing system; and
a memory system that is coupled to the processing system and that includes instructions that, when executed by the processing system, cause the processing system to provide a Basic Input/Output System (BIOS) engine that is configured, subsequent to a current initialization and prior to an immediately subsequent initialization, to:
retrieve a key from a key storage subsystem;
store the key in a BIOS memory subsystem;
receive, from an operating system engine, a current key request that identifies the key;
determine, in response to receiving the current key request, that the key stored in the BIOS memory system has not previously be accessed subsequent to the current initialization and prior to the subsequent initialization;
provide, in response to determining that the key stored in the BIOS memory system has not previously been accessed subsequent to the current initialization and prior to the subsequent initialization, the key from the BIOS memory subsystem to the operating system; and
prevent the key from being provided from the BIOS memory subsystem in response to any subsequent key request.

9. The IHS of claim 8, wherein the preventing the key from being provided from the BIOS memory subsystem in response to any subsequent key request includes:
incrementing a key request counter in response to providing the key from the BIOS memory subsystem to the operating system;
receiving a first subsequent key request that identifies the key;
determine, in response to receiving the first subsequent key request, that the key request counter was incremented; and
returning, in response to determining that the key request counter was incremented, a key retrieval error in response to the first subsequent key request.

10. The IHS of claim 8, wherein the preventing the key from being provided from the BIOS memory subsystem in response to any subsequent key request includes:
erasing the key from the BIOS memory subsystem in response to providing the key from the BIOS memory subsystem to the operating system;
receiving a first subsequent key request that identifies the key; and
determine, in response to receiving the first subsequent key request, that the key is no longer stored in the BIOS memory subsystem.

11. The IHS of claim 8, wherein the BIOS engine is configured to:
determine, in response to receiving the current key request, that the current initialization is an NVMe-over Fabrics (NVMe-oF) initialization;
provide, in response to determining that the current initialization is an NVMe-oF initialization and that the key stored in the BIOS memory system has not previously be accessed subsequent to the current initialization and prior to the immediately subsequent initialization, the key from the BIOS memory subsystem to the operating system.

12. The IHS of claim 8, wherein the BIOS memory subsystem includes a System Management Random Access Memory (SMRAM) that is only accessible in a System Management Mode (SMM).

13. The IHS of claim 8, wherein the current key request is received from a bootloader sub-engine included in the operating system engine.

14. A method for providing keys between a Basic Input/Output System (BIOS) and an Operating System (OS), comprising:
retrieving, by a Basic Input/Output System (BIOS) engine as part of a current initialization, a key from a key storage subsystem;
storing, by the BIOS engine, the key in a BIOS memory subsystem;
receiving, by the BIOS engine from an operating system engine, a current key request that identifies the key;
determining, by the BIOS engine in response to receiving the current key request, that the key stored in the BIOS memory system has not previously be accessed subsequent to the current initialization and prior to a subsequent initialization;
providing, by the BIOS engine in response to determining that the key stored in the BIOS memory system has not previously been accessed subsequent to the current initialization and prior to the subsequent initialization, the key from the BIOS memory subsystem to the operating system; and preventing, by the BIOS engine, the key from being provided from the BIOS memory subsystem in response to any subsequent key request.

15. The method of claim 14, wherein the preventing the key from being provided from the BIOS memory subsystem in response to any subsequent key request includes:
   incrementing a key request counter in response to providing the key from the BIOS memory subsystem to the operating system;
   receiving a first subsequent key request that identifies the key;
   determine, in response to receiving the first subsequent key request, that the key request counter was incremented; and
   returning, in response to determining that the key request counter was incremented, a key retrieval error in response to the first subsequent key request.

16. The method of claim 14, wherein the preventing the key from being provided from the BIOS memory subsystem in response to any subsequent key request includes:
   erasing the key from the BIOS memory subsystem in response to providing the key from the BIOS memory subsystem to the operating system;
   receiving a first subsequent key request that identifies the key; and
   determine, in response to receiving the first subsequent key request, that the key is no longer stored in the BIOS memory subsystem.

17. The method of claim 14, further comprising:
   determining, by the BIOS engine in response to receiving the current key request, that the current initialization is an NVMe-over Fabrics (NVMe-oF) initialization;
   providing, by the BIOS engine in response to determining that the current initialization is an NVMe-oF initialization and that the key stored in the BIOS memory system has not previously be accessed subsequent to the current initialization and prior to the immediately subsequent initialization, the key from the BIOS memory subsystem to the operating system.

18. The method of claim 14, wherein the BIOS memory subsystem includes a System Management Random Access Memory (SMRAM) that is only accessible in a System Management Mode (SMM).

19. The method of claim 14, wherein the current key request is received from a bootloader sub-engine included in the operating system engine.

20. The method of claim 14, further comprising:
   establishing, by the operating system engine, an NVMe over Fabrics (NVMe-oF) secure communication session with an NVMe storage device using the key.

* * * * *